Figures 1, 2:
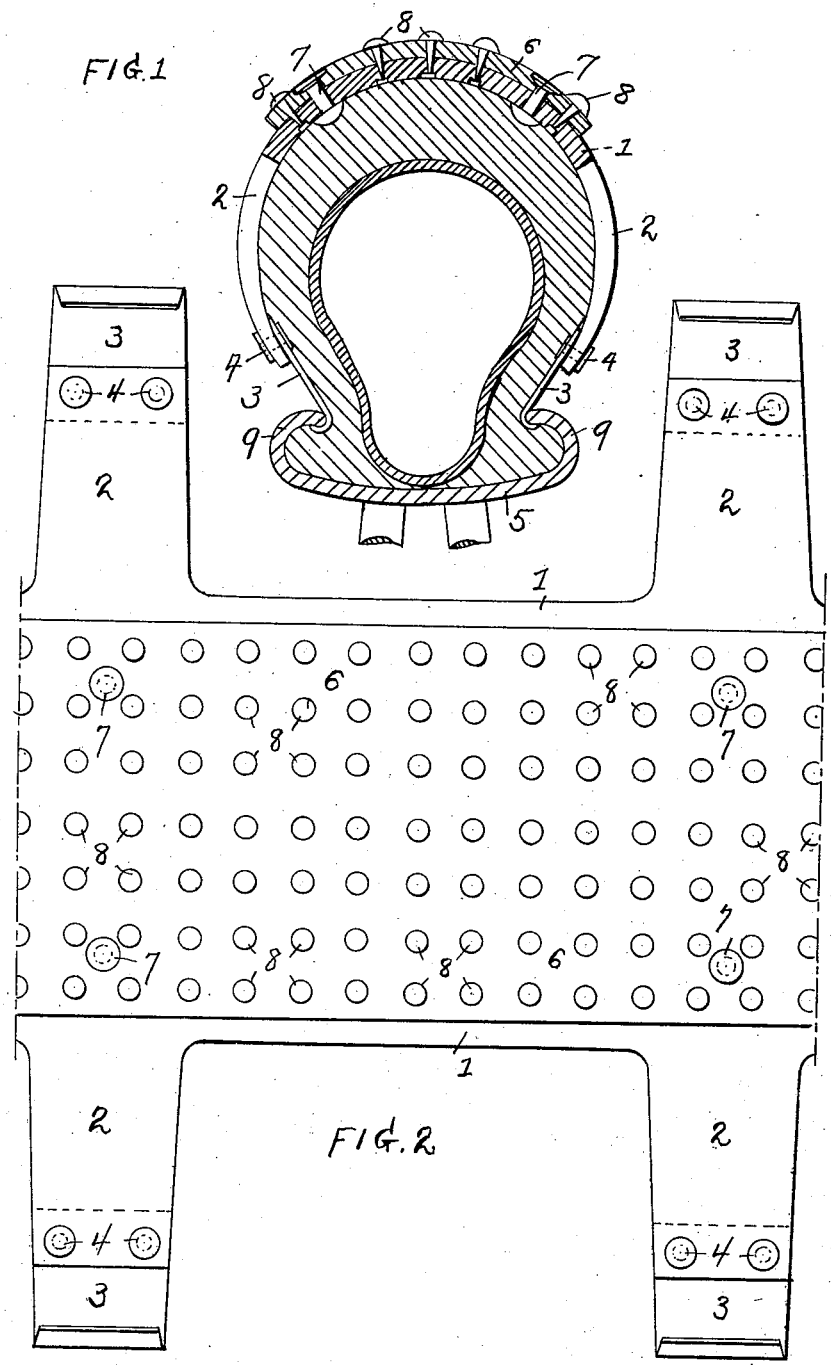

No. 755,310. PATENTED MAR. 22, 1904.
L. NIORÉ.
PROTECTOR FOR PNEUMATIC TIRES.
APPLICATION FILED DEC. 7, 1903.
NO MODEL.

WITNESSES:

INVENTOR
Léon Nioré
BY Howson and Howson
HIS ATTORNEYS.

No. 755,310. Patented March 22, 1904.

UNITED STATES PATENT OFFICE.

LÉON NIORÉ, OF CHÂTEAU-RENAULT, FRANCE.

PROTECTOR FOR PNEUMATIC TIRES.

SPECIFICATION forming part of Letters Patent No. 755,310, dated March 22, 1904.

Application filed December 7, 1903. Serial No. 184,218. (No model.)

*To all whom it may concern:*

Be it known that I, LÉON NIORÉ, manufacturer, a citizen of the Republic of France, and a resident of Château-Renault, Indre-et-Loire, France, have invented certain new and useful Improvements in Protectors for Pneumatic Tires, of which the following is a specification.

This invention relates to a leather or similar cover or protector intended to protect pneumatic tires of all kinds against objects liable to injure or puncture them when in use. This cover or protector is shown in the accompanying drawings.

Figure 1 is a transverse section; Fig. 2, a portion of the protector developed.

It is composed of a band of tanned leather 1, which has been smoothed or glazed and curried and then hammered, shaped, and bent to cause it to practically assume the form of the tire to be covered. The edges of this band are provided at intervals with lugs 2, terminating in metal hooks 3, fixed by means of rivets 4, which engage under the flange 9 of the rim 5. The band is thus maintained in place both by the hooks 3 as well as by the pressure of the inflated tire. Above this band 1 there is applied as running surface or tread a second thickness of leather 6, solidly attached to the former one by a series of metal rivets 7, which are level with the leather on the exterior, and the opposite extremities of which rivets are terminated by a rounded head, which sinks into the india-rubber of the tire and prevents any circumferential displacement of the protector. The tread 6 is strengthened with headed pins or points 8, riveted in the thickness of the tire. To the protector thus constituted there may be added either a flexible metal band of steel, copper, or lattice or net work, or a band of canvas located between the two thicknesses of leather 1 and 6 or even between the protector and the rubber tire. Similarly, in order to preserve the correct cross-section of the protector the edges of the band 1 may be strengthened with wire or thin strips of metal provided with points which are riveted on the inner side.

The form, dimensions, and thickness of the protector may of course vary according to the tires to which it is applied. Similarly the method of attachment by lugs and hooks, which suits pneumatic tire with thickened edges, may be replaced by any other methods of fastenings—for instance, bolts, buckles, laces, and the like.

This kind of protector is applicable to pneumatic tires for all kinds of vehicles for animal or mechanical motive power, as well as for bicycles, tricycles, and the like.

Having now particularly described and ascertained the nature of my said invention and in what manner the same is to be performed, I declare that what I claim is—

A protector for pneumatic tires of all kinds, comprising a leather band 1 shaped according to the form of the tire, and which is attached to the rim by lugs 2 provided with hooks 3 which engage with the same or in any other suitable manner, said band 1 being combined with a tread 6 also of leather firmly attached to the former by means of rivets 7 the internal head of which is embedded in the india-rubber of the pneumatic tire, the second band 6 being armed or shod by means of riveted nails substantially as described.

In testimony whereof I have signed my name to this specification in the presence of two subscribing witnesses.

LÉON NIORÉ.

Witnesses:
 ALPHONSE MAJEAN,
 H. C. COKE.